(No Model.)
E. W. THOMPSON.
SEED OR GRAIN FEEDING MACHINE.
No. 360,929. Patented Apr. 12, 1887.
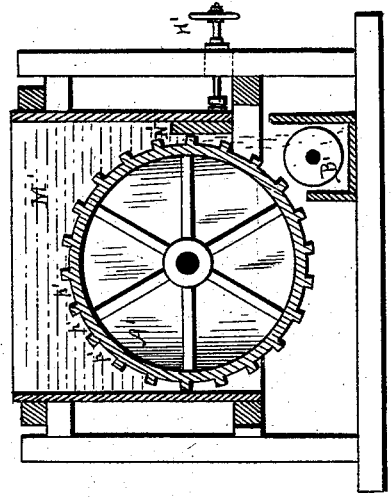
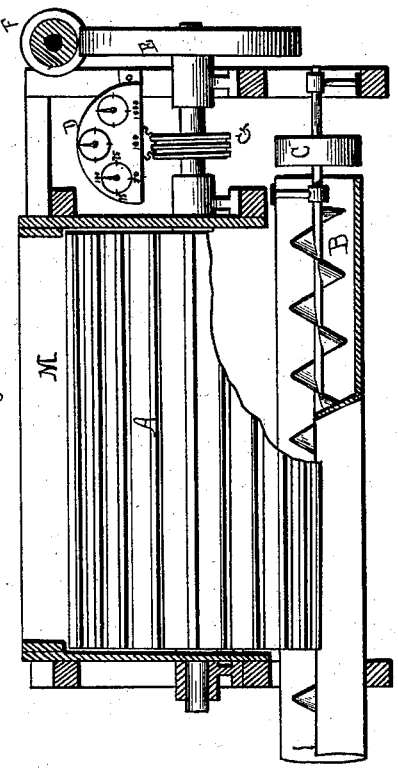
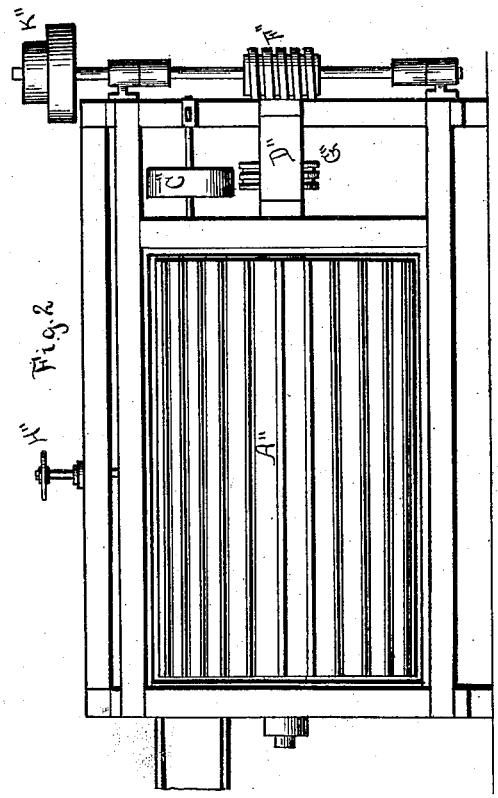
Witnesses.
Rob⁴ Thompson Jr
Chas Thompson
Inventor.
Erwin W. Thompson

UNITED STATES PATENT OFFICE.

ERWIN W. THOMPSON, OF AUGUSTA, GEORGIA.

SEED OR GRAIN FEEDING MACHINE.

SPECIFICATION forming part of Letters Patent No. 360,929, dated April 12, 1887.

Application filed December 31, 1886. Serial No. 223,102. (No model.)

*To all whom it may concern:*

Be it known that I, ERWIN W. THOMPSON, a citizen of the United States, residing at Augusta, in the county of Richmond and State of Georgia, have invented a new and useful Seed or Grain Feeding Machine, of which the following is a specification.

My improvement relates to seed or grain feeding machines in which a hopper sets over a revolving fluted roller or cylinder, and in which the number of revolutions of the fluted cylinder may be varied at will and recorded by a counter attached.

The objects of my invention are to feed seed or grain to be submitted to any operation desired to be performed upon it with regularity, to vary the feed at will, and to record the revolutions of the machine, by which the amount of seed or grain fed in a given time may be known. I attain these objects by the mechanism illustrated in the accompanying drawings, in which—

Figure 1 is a vertical section of the machine. Fig. 2 is a plan of the machine, and Fig. 3 is an end elevation of a section through the center.

Similar letters refer to similar parts throughout the several views.

The machine consists of a fluted roller or cylinder, A, A', and A'', Figs. 1, 2, and 3, over which the space $m\ m'$ is inclosed, so that the sides about this space make a hopper or receptacle for the seed or grain to be fed. The cylinder is carried by a shaft resting in bearings resting on a frame made suitable to carry it, and the hopper may be also constructed in the same frame, as in the drawings.

On one end of the cylinder-shaft, Fig. 1, E is a worm-wheel, and F is a worm. A belt on the pulley K'', Fig. 2, drives the worm F F'', Figs. 1 and 2, and this worm operating in the worm-wheel E, Fig. 1, gives a revolving motion to the cylinder A A' A'', Figs. 1, 2, and 3. On the same cylinder-shaft I have another worm, G G'', Figs. 1 and 2, which is geared into a toothed wheel in the counter D D'', and by means of this counter being operated by a worm on the shaft of the cylinder I am enabled to know the number of revolutions made by the cylinder in a given time.

B B', Figs. 1 and 3, represent a conveyer for carrying the seed fed to the machinery by which they are to be operated upon. When the hopper M M' is filled with seed or grain and the cylinder A A' A'' is being revolved at a given speed, then the feed must remain regular, since the only material fed through is what is contained in the flutes $p'\ p'\ p'$, &c., Fig. 3, the roller and side of the hopper being so adjusted at N' that no other seed can pass through except what is contained in the flutes. The seeds so fed are carried by the conveyer B B', Figs. 1 and 3, to any other machine desired. It is by means of this combination of a fluted cylinder and the hopper and conveyer that I attain the regular feed.

By changing my driving-belt from one step to another on the stepped pulley K'', Fig. 2, I change the speed of the fluted cylinder A A' A'', and thereby change the amount of material fed in a given time. Then, by measuring the amount of seed fed by one revolution of the cylinder A A' A'' and noting the number of revolutions made in a given time as recorded by the counter D attached, Fig. 1, the quantity of seed passed through in a given time may be known.

I am aware that seed and grain feeding machines have been used, prior to my invention, having fluted rollers, in combination with a flue or hopper. I therefore do not claim such a combination, broadly; but What I do claim as my invention, and desire to secure by Letters Patent, is—

1. In a seed or grain feeding machine, the combination of the hopper, and the fluted cylinder rotating therein, adapted to feed the grain or seed to and in combination with a spiral conveyer located beneath the hopper for delivering the grain, as and for the purposes described.

2. In a seed or grain feeding machine, a fluted cylinder, in combination with a hopper having one of its walls hinged or pivoted and means for adjusting the same for varying the feed, substantially as described.

3. In a seed or grain feeding machine, the hopper, the revolving fluted cylinder, means, substantially as described, for varying the feed of said cylinder, and the spiral conveyer for delivering the seed or grain at a given point, in combination with means for driving the feeding-cylinder at varying speeds, and for registering the number of its revolutions, substantially as described.

ERWIN W. THOMPSON.

Witnesses:
ROBT. THOMPSON, Jr.
CHAS. THOMPSON.